Dec. 23, 1969  KATSUYA KOZAI  3,485,690
ULTRASONIC FIXING METHOD OF PHOTOGRAPHIC FILM
Filed March 6, 1967
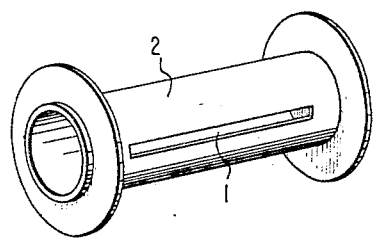
FIG.1
FIG.2A
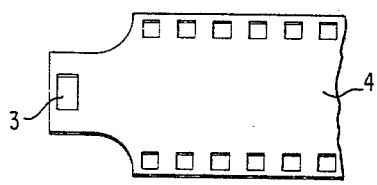
FIG.2B
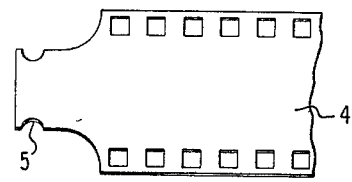
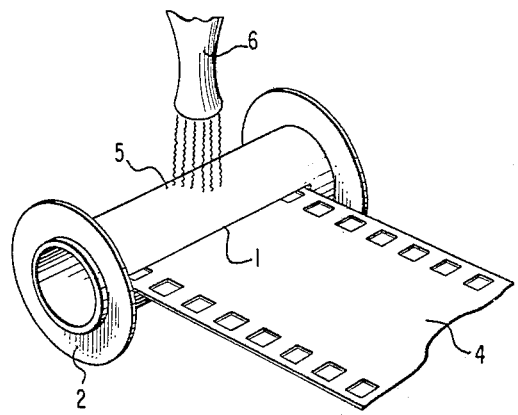
FIG.3
INVENTOR
KATSUYA KOZAI
BY *Sughrue, Rothwell, Mion, Zinn & Macpeak*
ATTORNEYS

United States Patent Office 3,485,690
Patented Dec. 23, 1969

3,485,690
ULTRASONIC FIXING METHOD OF PHOTOGRAPHIC FILM
Katsuya Kozai, Ashigara-machi, Japan, assignor to Fuji Shashin Film Kabushiki Kaisha, Nakanuma Minami Ashigara-machi, Ashigara-Kamigun, Kanagawa, Japan
Filed Mar. 6, 1967, Ser. No. 620,857
Claims priority, application Japan, Mar. 4, 1966, 41/13,286
Int. Cl. B32b 7/08; B29c 27/08
U.S. Cl. 156—73         3 Claims

ABSTRACT OF THE DISCLOSURE

A method of fixing film to a resinous spool base by notching the film at one end and inserting the film end into a narrow gap in the core portion of the spool and deforming the wall faces of the gap using ultrasonic waves such that the wall faces join together through the notches in the film. This invention relates to a method of fixing photographic film on a winding core of photographic film spool of resin material.

BACKGROUND OF THE INVENTION

The prior art

Heretofore, methods of fixing a photographic film on a spool generally comprised either adhering the film to the spool by known means of an adhesive or adhesive tape, or forming an aperture in the film and engaging the aperture with a projection formed on the core portion of the spool. However, in these methods, an adhesive had to be selected that did not adversely affect the photographing property of the film. Accordingly there have been limits in the ability of the adhesive to fix the film to the spool thus resulting in the loosening of the film from the spool during handling thereof. As to the method wherein an aperture is formed in the film end to engage a projection formed at the core portion of spool, there have been difficulties in the conservation of the mold for manufacturing the spool.

This invention relates to a method of attaching a film to a spool core portion such that the process of fixation of the film to the spool core portion is simplified as compared to the prior art methods, and also whereby the film can be very tightly fixed to the core portion without adversely affecting the photographic properties thereof.

Brief summary of the invention

This invention relates to a method of fixing film to a spool comprising the steps of inserting a film provided with an aperture or notches at the end thereof into a narrow gap in the core portion of the spool consisting of resin material and joining the opposing wall faces of the gap in the core portion together through the aperture or notches by melting or deforming the wall faces by applying ultrasonic waves thereto.

When a sheet which is provided with an aperture or notches and made of a material differing from that of the resin body is inserted into a gap formed in the resin body and ultrasonic waves are applied thereto, the opposite portions of the upper and lower wall faces facing through said aperture or notches are joined together through said aperture or notches or deformed therein whereby the sheet, namely, photographic film, can be fixed in the gap of the resin body, namely, spool core portion.

DETAILED DESCRIPTION OF THE INVENTION

Suitable resins as materials for the resin body are vinyl chloride, polyethylene, polypropylene, nylon polyamide, polystyrene or ABS acrylonitrile-butadiene-styrene, etc. Cellulose acetate may also be employed.

Photographic film is normallly coated with an emulsion layer including gelatin as a principal component and a protective layer therefor on the surface of the acetic acid cellulose or polyethylene terephthalate base support body and also coated with a layer including gelatin as a principal component on the back thereof. However, even though the material of the resin body is the same as that of the film base, the objects of the invention will be achieved inasmuch as the coating layer on the film is different from that of the resin body. In the case of a photographic film on the back of which the layer is not applied, a resin body differing from the resin of the base support body must be used.

Materials of the upper and lower walls of the gap are generally the same kind of resin, however, the object will be also attained if a combination either of vinyl chloride with acryl or of vinyl chloride with polystyrene is used.

As above mentioned, according to the present invention, a photographic film can be firmly fixed to a spool by forming an aperture or notches in the end portion of the film, inserting the end portion into a narrow gap of the spool and applying supersonic waves to the gap area in the direction from the outside of the spool thereby eliminating any adverse influence upon the photographing property of the film.

The object and advantages of this invention will become apparent from the example when taken in conjunction with the following drawings, wherein FIG. 1 to 3 are perspective views showing an embodiment of the present invention respectively.

EXAMPLE

A spool 2 was made from each resin shown in the following table with a gap 1 formed therein, as shown in FIG. 1, and a photographic film 4 provided with an aperture 3 such as shown in FIG. 2A or notches 5 such as shown in FIG. 2B was inserted into the gap 1, and supersonic waves were applied to the spool 2 in the direction from the upper side to the gap 1 by means of a supersonic wave horn 6 so that the respective wall portions facing the aperture or notches was melt-joined together through the aperture or notches, whereby the photographic film 4 can be fixed to the spool. The time period for applying supersonic waves was from 3 to 5 seconds.

TABLE

| Material: | Degree of melt-joining |
|---|---|
| Vinyl chloride | Very good |
| Polyethylene | Very good |
| Polypropylene | Very good |
| Nylon | Very good |
| Polystyrene | Very good |
| ABS | Very good |
| Acetic acid cellulose | Good |

While this invention has been described with particular reference to a preferred type, other embodiments will be apparent to those skilled in the art. It is therefore intended to limit the invention only by the scope of the claims.

What is claimed is:
1. A method of fixing a photographic film to a spool comprising making a spool having a narrow gap in the core portion thereof from a resin material, inserting a photographic film provided with an aperture or notches into said gap and applying supersonic waves to the spool in the direction from the outer side of the spool to the gap thereby joining together both the wall faces of the spool core portion facing through said aperture or notches by melting and deformation thereof.

2. The method of claim 1 wherein the film surface contacting the spool surface and the spool are formed from different materials.

3. The method of claim 1 wherein said resin material is selected from the group consisting of vinyl chloride, polyethylene, polypropylene, polyamide, polystyrene, acrylonitrile-butadiene-styrene and cellulose acetate.

References Cited

UNITED STATES PATENTS

| | | | |
|---|---|---|---|
| 2,006,663 | 7/1935 | Weis | 242—74 |
| 3,224,915 | 12/1965 | Balamuth | 156—73 |
| 3,294,616 | 12/1966 | Linsley | 156—580 |
| 3,300,156 | 1/1967 | Tucker | 242—74.1 |
| 3,419,447 | 12/1968 | Hewitt | 156—304 X |

CARL D. QUARFORTH, Primary Examiner

A. J. STEINER, Assistant Examiner

U.S. Cl. X.R.

156—185, 303.1; 242—74